United States Patent [19]
Wolfe et al.

[11] Patent Number: 5,832,812
[45] Date of Patent: Nov. 10, 1998

[54] DUAL CONVEYER OVEN

[76] Inventors: Ronald Dale Wolfe, 1922 Cardington, Wichita, Kans. 67212; Dwane Dale Wolfe, 12025 Lynndale, Wichita, Kans. 67235

[21] Appl. No.: 806,089

[22] Filed: Feb. 25, 1997

[51] Int. Cl.$^6$ .............................. A21B 1/00; A23L 3/00; A47J 37/00; F24C 15/32
[52] U.S. Cl. ............................ 99/443 C; 99/386; 99/447; 99/476; 99/477; 432/144; 432/152; 126/21 A
[58] Field of Search .................................. 99/386, 443 R, 99/443 C, 447, 476, 477, 468; 34/218, 225; 126/21 R, 21 A; 198/780, 774.3; 219/388, 400, 495; 432/144, 145, 152, 199; 426/233, 315, 506, 523

[56] References Cited

U.S. PATENT DOCUMENTS

| | | | |
|---|---|---|---|
| 4,389,562 | 6/1983 | Chaudoir | 99/386 X |
| 4,554,437 | 11/1985 | Wagner et al. | 219/388 |
| 4,610,886 | 9/1986 | Buller-Colthurst | 426/233 |
| 4,655,126 | 4/1987 | Wells | 99/447 X |
| 4,717,572 | 1/1988 | Buller-Colthurst | 99/443 C |
| 4,739,154 | 4/1988 | Bharara et al. | 219/400 X |
| 4,884,552 | 12/1989 | Wells et al. | 99/386 X |
| 4,951,648 | 8/1990 | Shukla et al. | 126/21 A |
| 5,077,072 | 12/1991 | Sieradzki | 426/523 |
| 5,088,391 | 2/1992 | Anderson | 99/423 |
| 5,121,677 | 6/1992 | Le Claire et al. | 99/443 C |
| 5,253,564 | 10/1993 | Rosenbrock et al. | 99/386 X |
| 5,606,904 | 3/1997 | Fabbri | 99/477 X |

Primary Examiner—Timothy F. Simone
Attorney, Agent, or Firm—Edward L. Brown, Jr.

[57] ABSTRACT

The oven of the present invention is a low profile, dual conveyer oven including an oven cabinet, two closely spaced conveyers and an air heating and circulation system. The conveyers and the oven cabinet are adapted so that the conveyers can be easily removed from the from the front or side of the oven cabinet. The oven cabinet houses the conveyers, ducts and manifolds which all can be easily removed for cleaning or other maintenance. Each of the conveyers include separately controlled drive motors capable of driving the each of conveyers at different speeds and in different directions. The air heating and circulation system features a transverse mounted burner tube, side mounted return air ducts, a central return air opening, common shaft mounted side fed dual centrifugal fans and hot air manifolds. The hot air manifolds are fed from the rear by the dual centrifugal fans and are adapted to surround the two closely spaced conveyers and supply those closely spaced conveyers with hot cooking air within a space having a very limited vertical dimension.

4 Claims, 2 Drawing Sheets

DUAL CONVEYER OVEN

FIELD OF THE INVENTION

The present invention relates to impingement ovens. Generally, such ovens include a cabinet, a conveyer mounted in the cabinet for carrying food products into, through and out of the cabinet, an heater for heating cooking air such as a gas burner for heating cooking air, fans for circulating heated cooking air, manifolds for delivering a flow of heated cooking air from the heater and fans to the conveyer. Usually ducts or passages are provided for returning air to the air heater for reheating.

PRIOR ART

Numerous examples of forced air conveyerized ovens can be found in the prior art. Generally, they include oven cabinets which carry single conveyers. In the prior art ovens, a conveyer is usually heated by air manifolds which are supplied by an axial fan situated in a fan box attached to the oven cabinet.

A dual conveyer oven is disclosed by Smith in U.S. Pat. No. 4,474,498. In U.S. Pat. No. 4,474,498, Smith discloses dual sets of air manifolds heating a two conveyer s within an oven cabinet. However, Smith in U.S. Pat. No. 4,474,498 discloses an impeller arrangement which draws return air from the front and exhausts vertically into adjacent air manifolds. This arrangement yields an effective dual conveyer oven but does not provide a duel conveyer oven which could also have a low profile. Further, Smith does not disclose in U.S. Pat. No. 4,474,498 conveyers that can be removed from the front of an oven cabinet or conveyers that can be separately controlled and driven.

A single conveyer low profile stackable oven is disclosed by Bruno, et al in U.S. Pat. No. 5,277,105. In U.S. Pat. No. 5,277,105, Bruno discloses an oven having a rear fed impeller. Bruno achieves a low profile by arranging the burner assembly across the oven cabinet generally perpendicular to the direction of the oven's conveyer. However, Bruno does not disclose the novel and surprising side fed centrifugal fan and manifold system found in the present invention.

The prior art also yields a number of patents disclosing conveyer ovens having various axial fan air manifold arrangements which have various commendable advantages and features. However, none of these prior art ovens seem to present the above described novel features and advantages found in the oven of the present invention.

BRIEF DESCRIPTION OF THE INVENTION

The present invention is directed toward a low profile dual conveyer impingement oven having an oven cabinet, two conveyer assemblies, a fan box, and a control unit. Each of the two conveyers are mounted in the oven cabinet so that they can convey food product in one side of the oven cabinet, through the oven cabinet and out through the other side of the oven cabinet along a common direction of movement. Each of the two conveyers is also driven by a separately controlled conveyer drive motor capable of operating over a range of speeds in either a clockwise or counter clockwise direction. The oven cabinet is adapted to allow each of the two conveyer assemblies to be easily removed from either side or the front of the oven cabinet. The two centrifugal fans and their common shaft are positioned parallel to the direction of movement of the conveyers. A burner tube for heating cooking air is located in the fan box and is also positioned parallel to the direction of movement of the conveyers. Also located in the fan box and positioned parallel to the direction of movement of the conveyers are two centrifugal fans mounted on a common shaft which is driven by a remote fan drive motor. Each centrifugal fan is adapted to draw heated cooking air in from each of their sides and expel a stream of heated cooking air into a plenum that divides to feed three hot air manifolds. The hot air manifolds are adapted to force hot cooking air up into and down onto each conveyer assembly. An opening in the oven cabinet between the two sets of three manifolds allows return air to flow into the fan box. Return air ducts in communication with the fan box are situated at the sides of the oven and are also used to draw return air back into the fan box. Appropriate controls and means located in a control and drive unit are provided to operate and provide gas and air to the burner tube, and provide electricity to the fan drive motor and the conveyer drive motors.

The oven of the present invention uses space very efficiently. Because the oven of the present invention has a pair of centrifugal fans mounted on a common drive shaft each of which supply triple hot air manifolds surrounding two conveyer assemblies, it is possible to provide a dual conveyer oven in a very compact vertical space. More particularly, the centrifugal fans of the oven of the present invention each have length to diameter ratio greater than one and are mounted parallel to the direction of movement of the conveyer assemblies and draw air in from either side in an intake stream that is substantially parallel to their axis of rotation and expel an exhaust stream that is generally normal to their axis of rotation. Further, the centrifugal fans of the present invention are adapted to expel a generally uniform stream of hot cooking air that can then be easily divided into three air streams to feed three manifolds. This novel and improved air flow arrangement makes it possible to uniformly supply three hot air manifolds that can in turn provide hot cooking air to the top and bottom of each of the two conveyers. Because the centrifugal fans have small diameters relative to their size and capacity, because the exhaust streams from the centrifugal fans are easily diverted into the three manifolds. Therefore a dual conveyer oven needing three manifolds can be accomplished in a limited vertical space. Because the dual conveyer oven of the present invention has such a low profile, it can then also be stacked to provide a pair of ovens having a total of four conveyers still within a reasonable vertical space. These advantages provide an operator with a very large amount of cooking capacity in a limited space.

The oven of the present invention also uses space very efficiently because it can be taken apart within a limited space. It has an oven cabinet that is adapted to allow each of the two conveyer assemblies to be easily removed from either side or the front of the oven cabinet.

The oven of the present invention can also cook food product with a high degree of versatility. Because the oven of the present invention has conveyers that are driven by separately controllable conveyer drive motors capable of rotating in different directions at different speeds, an operator employing a pair of ovens or even a single oven enjoys the advantage of being able to cook different types of food at different rates depending on the speeds of operation of the conveyers.

The oven of the present invention greatly reduces the time and effort required to accomplish cleaning and maintenance operations. All of the present oven's ducts, manifolds and conveyer assemblies can be easily removed from the front of the oven cabinet without the use of special skills or without the use of tools of any kind.

These and other advantages of the oven of the present invention will become apparent to the skilled reader who reads the detailed description given below.

BRIEF DESCRIPTION OF THE DRAWINGS

The following detailed description refers to the attached drawings in which.

DETAILED DESCRIPTION OF THE PREFERRED EMBODIMENT

Figure 1:
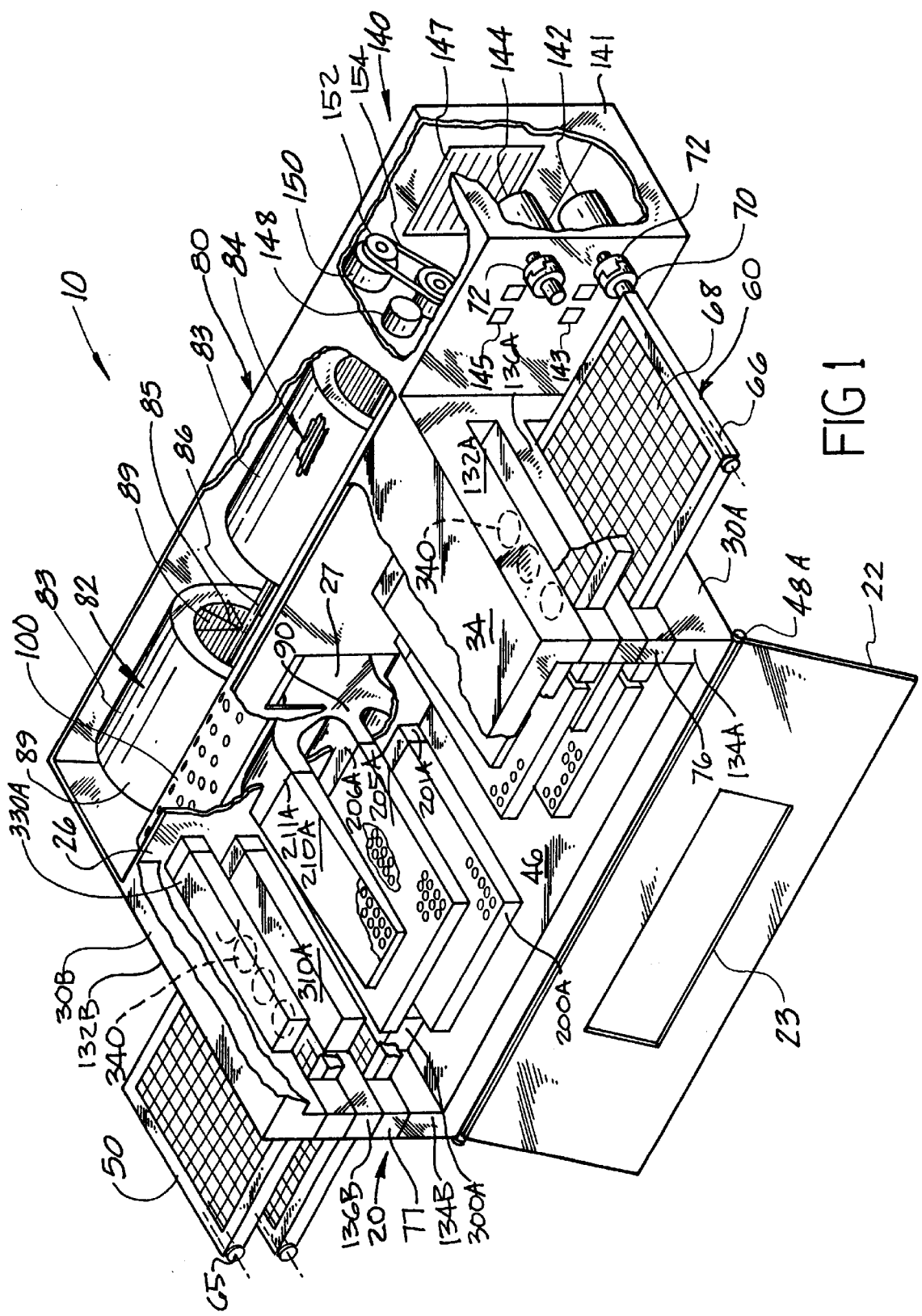
FIG. 1 is perspective view of the oven of the present invention with portions broken away.

The oven of the present invention is shown in FIG. 1 and is generally described by reference numeral 10. Oven 10 generally includes an oven cabinet 20, conveyer assemblies 50 and 60, fan box 80 and a control and drive unit 140.

As is illustrated in FIG. 1, oven cabinet 20 further includes a front panel 22, a back wall 26, two side walls 30A and sidewall 30B, a top wall 34 and a bottom wall 46. As shown in FIG. 1, front panel 22 is pivotably attached to bottom wall 46 by hinges 48A and 48B. Front panel 22 could alternately be pivotably attached to top wall 34 by hinges located at its forward edge 36. Front panel 22 also includes a hatch 23 which provides partial access to the center of oven cabinet 20 during operation. Back wall 26 separates fan box 80 from the oven cabinet 20. It has a number of openings to accommodate air manifolds and return ducts as well as a return air opening 27. Side walls 30A and 30B are symmetrical. Each side wall 30A and 30B includes top cantilevered portions 132A and 132B, bottom cantilevered portions 134A and 135B and center cantilevered portions 136A and 136B. Top cantilevered portions 132A and 132B and center cantilevered portions 136A and 136B define a top pair of opposite horizontal conveyer openings 142A and 142B. Similarly, bottom cantilevered portions 134A and 134B and center cantilevered portions 136A and 136B define a bottom pair of opposite horizontal conveyer openings 144A and 144B. The two side walls 30A and 30B, top wall 34 and bottom wall 46 of oven cabinet 20 are generally hollow and constructed from thin stainless steel sheet which has very high strength and is very resistant to corrosion. In the preferred embodiment these walls may have internal insulating material and reinforcing members to provide strength and increase energy efficiency. In the preferred embodiment top wall 34, top cantilevered portions 132A and 132B and center cantilevered portions 136A and 136B are structurally reinforced to resist with minimal deflection any vertical bending loads resulting from the oven's own weight and the weight of an additional oven should the user wish to stack two ovens together. Because the user may wish to stack two ovens to provide a combined oven, it should be readily apparent to those skilled in the art that the above described elements of cabinet 20 be strong but also light.

CONVEYER ASSEMBLY DETAILS

Figure 3:
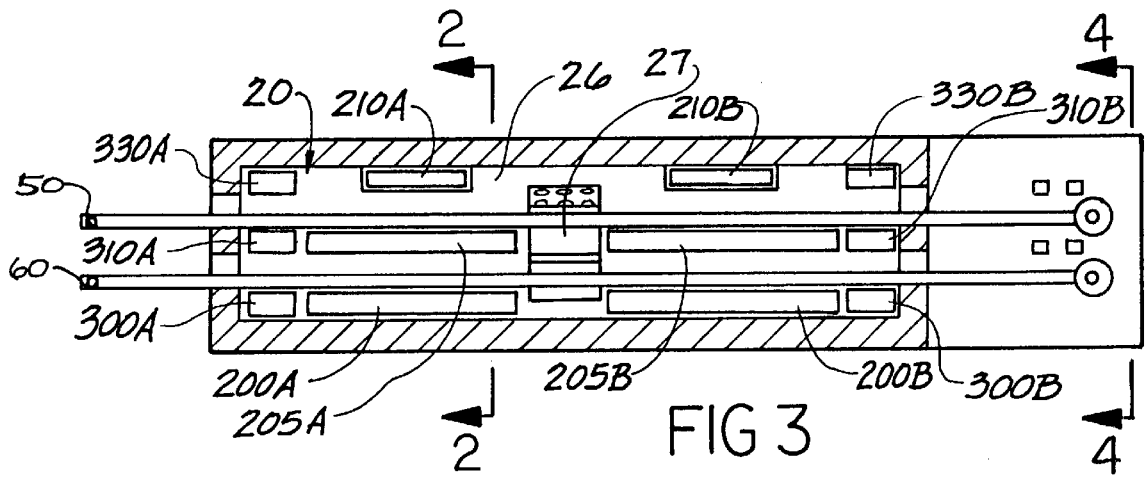
FIG. 3 is a sectional view of the oven of the present invention taken along line 3—3 of FIG. 1.

As shown in FIGS. 1 and 3, oven cabinet 20, carries an upper conveyer assembly 50 and a lower conveyer assembly 60. In the preferred embodiment of the present invention, upper conveyer assembly 50 and lower conveyer assembly 60 are substantially interchangeable. More particularly, lower conveyer assembly 60 comprises a frame 64 which in turn carries two rotating sprocket shafts 65 and 66. Wire mesh belt 68 defines a continuous loop around sprocket shafts 65 and 66. Frame 64 also carries a rigid wire frame (not shown) disposed between sprocket shafts 65 and 66 that further supports wire mesh belt 68. Each conveyer assembly has a cogged coupling 70 situated at one end of shaft 66 for engaging a corresponding cogged coupling 72. Each cogged coupling 72 is connected to a separately controllable conveyer drive motor 142 and 144 which are described below. Cogged couplings 70 and 72 are adapted for easy engagement and disengagement.

SUPPORT OF CONVEYER ASSEMBLIES

As can be seen in FIG. 1, oven cabinet 20 is adapted to receive and support upper conveyer assembly 50 and lower conveyer assembly 60 either from the front or either side of oven cabinet 20. Support members 76 and 77 are fixed to conveyer assembly frame 64 and lower conveyer assembly 60 and are sized and located to fit within the gaps between center cantilevered portions 136 and adjacent top cantilevered portion 132 or adjacent bottom cantilevered portion 134. As can be further seen in FIGS. 1 and 4, similar support members 52 and 53 are attached to conveyer assembly 50. As illustrated in FIG. 3, conveyer assembly 50 and conveyer 60 are adapted to convey food product in through horizontal openings 142A and horizontal opening 144A, through the interior of oven cabinet 20 and out through opposite corresponding horizontal openings 142B and 144B.

AIR HEATING AND CIRCULATION SYSTEM IN GENERAL

The oven of the present invention as seen in FIG. 1 has an air heating and circulation system that includes fan box 80, a burner 148, a burner tube 100, a means for allowing spent cooking air to return to fan box 80 from oven cabinet 20 such as air return ducts 300A, 300B, 310A, 310B, 330A, 330 B and air return opening 27, centrifugal fans 82 and 84, plenums for dividing hot cooking air, and hot air manifolds 200A, 200B, 205A, 205B, 210A and 210B. Fan box 80, situated behind oven cabinet 20, shares back wall 26 with oven cabinet 20. Fan box 80 is a generally air tight chamber where returning air is sucked in from air return ducts 300A, 300B, 310A, 310B, 330A, 330 B and air return opening 27. Air in box 80 is heated by burner tube 100 before entering centrifugal fans 82 and 84. Left and right centrifugal fans 82 and 84 are mounted in fan box 80 on a common shaft 86 and are positioned and adapted to draw air into the ends along an intake stream generally parallel to common shaft 86 and to expel a substantially uniform non swirling column of air in a forward direction towards oven cabinet 20. Two identical plenum deflector arrangements described in detail below distribute hot cooking air from left and right centrifugal fans 82 and 84 to hot air manifolds 200A, 200B, 205A, 205B, 210A and 210B.

HOT AIR MANIFOLD DETAILS

Figure 2:
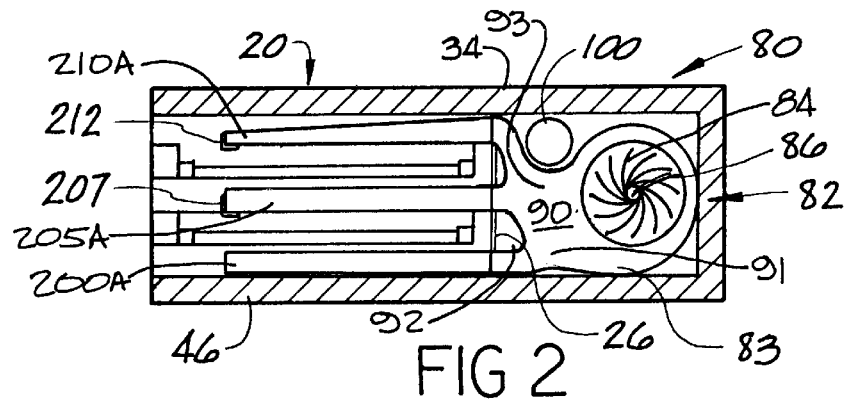
FIG. 2 is a sectional view of the oven of the present invention taken along line 2—2 of FIG. 1.

FIG. 1 shows how the left hot air manifolds attach to back wall 26 of oven cabinet 20. Lower, center and upper hot air manifolds 200A, 205A and 210A slide into corresponding collar joints 201A, 206A and 211A that are fixed to back wall 26. Not shown in FIGS. 1 or 2 are identical collar joints provided for the right manifolds 200B, 205B and 210B. All of the hot air manifolds are generally hollow stainless steel boxes that are open at one end where they are joined to their corresponding collar joint. As shown in FIG. 2, while lower hot air manifolds 200A rests on lower wall 46 of oven cabinet 20, the center and upper hot air manifolds 205A and 210A are supported at each end opposite back wall 26 by support angles 207 and 212. Lower manifolds 200A and 200B, center manifolds 205A and 205B and upper manifolds 210A and 210B are interchangeable. Accordingly, only the left manifolds need to be described in detail. As can be seen in FIG. 1, upper surface 202 of lower manifold 200A has a pattern of air holes 203. Center manifold 205A has an upper surface 208 and a lower surface 207 which is shown in a cut away portion of center manifold 205A. Upper surface 208 of center manifold 205A has a pattern of air holes 228. As can also be seen in the cut away portion of center manifold 205A of FIG. 1, lower surface 207 of center manifold 205A also has a pattern of air holes 227.

Figure 5:
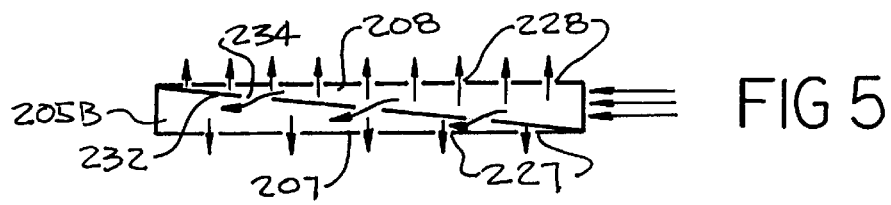
FIG. 5 is a sectional view to an enlarged scale of the hot air air manifold 205 taken along line 5—5 of FIG. 1.

In FIG. 5, manifold 205B is shown in section with a flow divider plate 232 extending from one end diagonally to the other. A series of air holes 234 in divider plate 232 restricts the amount of air flowing out of the holes 227 on the bottom surface 207, as compared with the air flowing out of the top surface holes 228 so that the top air flow is over twice the bottom air flow.

Shown in another cut away view in FIG. 1, upper manifold 210A has a lower surface 214 having a pattern of air holes 216. In the preferred embodiment, the hole bearing surfaces are defined by removable plates that can be removed for easy cleaning. Also in the preferred embodiment, the size of these ducts and the number of air holes in their various surfaces have been adapted so that the air flow that is directed up into the conveyers from the manifolds is about twice as intense as the air flow that is directed down upon the conveyers. This particular configuration is adapted for a specific application and it should be apparent to those skilled in the art that other manifold configurations could be used to achieve different air distribution characteristics.

RETURN AIR DUCT DETAILS

The oven of the present invention has a means for returning air from the oven cabinet back to the fan Box 80. FIGS. 1 and 3 show six return air ducts: left and right lower return air ducts 300A and 300B, left and right center return air ducts 310A and 310B and left and right upper return air ducts 330A, and 330B. FIG. 1 shows how the left return air ducts attach to back wall 26 of oven cabinet 20. Each of the return air ducts is open at both ends and, with the exception of lower return air ducts 300A and 300B, have a pattern of return air return openings 340 in their lower surfaces adjacent to their ends opposite back wall 26 of oven cabinet 20. As shown in FIG. 1, return air ducts 300A, 310A and 330A terminate well before they reach the front of oven cabinet 20. Support brackets (not shown) can be attached to adjacent side walls 132 of oven cabinet 20 to provide a means to support return air ducts 310A, 310B, 330A and 330B or in the alternative a portion of each of return air ducts 310A, 310B, 330A and 330B could be extended and adapted to rest on support angles 212 and 207 shown in FIG. 2.

MORE RETURN AIR DUCT DETAILS

In this preferred embodiment, return air ducts 300, 310 and 330 are adapted to pull spent hot air back to fan box 80 before it escapes through conveyer openings 142A, 142B, 144A and 144B of oven cabinet 20. Air return openings 340 are disposed near the end of the air return ducts 310, 320 and 330 because the inventors have found that air exiting from manifolds 200, 205, and 210 tends to move in a direction away from fan box 80. Air return openings are not placed in the upper surfaces of air return ducts 310, 320 and 330 because splattered material would then fall into the air return ducts thus making them difficult to clean.

DETAILS OF FAN/PLENUM ARRANGEMENT

In FIG. 2, left centrifugal fan 82 includes a stationary fan housing 83 and a fan impeller 84. Fan impeller 84 mounts to and is attached to a common drive shaft 86 by spokes 85. Common drive shaft 86 is carried by bearings at opposite ends of fan box 80 (not shown). Stationary fan housing 83 further includes open air inlet ends 89 and a plenum portion 90. Openings 89 at both ends of housing 83 admit heated air from fan box 80. As can be further seen in FIG. 2, air from plenum 90 is divided into a lower channel 91 and an upper channel 93 by bull nose deflector 92. Air from upper channel 93 feeds hot air manifolds 205 and 210 while air from lower channel 91 feeds hot air manifold 200. Another identical plenum channel arrangement on the right side (not shown) divides hot cooking air from right centrifugal fan 84 three ways to feed hot air manifolds 200, 205 and 210. Burner tube 100 is situated to heat returning air and also radiantly heat fan housing 83 to thereby further heat air flowing through fan 82. Although, the preferred embodiment of the present invention employs gas fired burner tube 100 to heat cooking air, any suitable air heating means could be employed to heat cooking air.

ADVANTAGES OF AIR HEATING AND DISTRIBUTION SYSTEM

An important advantage of the oven of the present invention is that it is a very low profile oven that has two conveyers which are both well supplied by forced hot cooking air. This is accomplished by using a centrifugal fan such as centrifugal fan 82 and a fan housing such as fan housing 83. With a dual inlet centrifugal fan 82 in combination with fan housing 83 having channels 91 and 93 feeding three manifolds 200, 205, and 210 ample airflow can be provided to both conveyer assemblies 50 and 60 within a limited vertical space. This advantageous air distribution arrangement can be repeated because centrifugal fans of relatively small diameter such as fans 82 and 84 can be arranged in series on a common drive shaft such as common drive shaft 86. This repeated triple manifold air distribution arrangement in combination with a common drive shaft carrying at least two centrifugal fans yields an oven capable of cooking food product on two conveyers within a very compact vertical space.

CONTROL AND DRIVE UNIT

Figure 4:
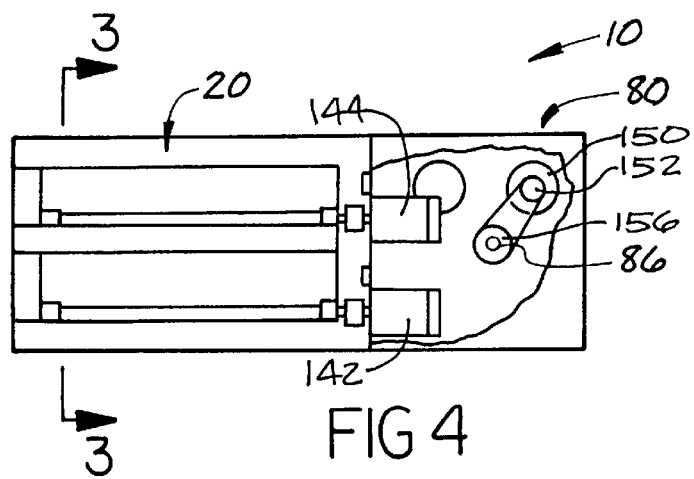
FIG. 4 is a side elevational view of the oven of the present invention taken along line 4—4 of FIG. 1.

As shown in FIGS. 1 and 4, control and drive unit 140 includes a housing 141, a burner 148, a fan drive motor 150 and conveyer drive motors 142 and 144. Housing 141 is generally a sheet metal box and has vents and louvers 147 on the sides and bottom for allowing air to flow freely into and out of drive unit 140. Burner 148 is a standard gas burner and is of the type that has a means for mixing air and natural gas as well as a means for blowing the mixture through a port and into a combustion zone where the mixture burns and liberates heat. Burner 148 introduces burning gases into burner tube 100 which runs the width of fan box 80. Burner 148 is adapted to allow manual control of the gas air mixture. As is further shown in FIG. 4, fan drive motor 150 is fitted with a pulley 152. The end of drive shaft 86 carries a drive pulley 156. A fan drive belt 154 runs between motor pulley 152 and drive pulley 156 and transfers power from fan drive motor 150 to drive shaft 86. Although fan drive motor 150 runs at a substantially constant rate, the diameters of motor pulley 152 and drive pulley 156 can be varied to adjust the rotational speed of drive shaft 86. In this way, different operating conditions, such as high altitude operations can be accommodated.

CONVEYER DRIVE SCHEME

As is also shown in FIGS. 1 and 4, control and drive unit 140 also includes a pair of conveyer drive motors 142 and 144. Each of the conveyer drive motors 142 and 144 has a cogged coupling 72 mounted on the motor shaft which each engage a corresponding releasable cogged coupling 70 associated with the conveyer assemblies. Each of the conveyer drive motors 142 and 144 is separately controlled by controls 143 and 145 respectively. Controls 143 and 145 and drive motors 142 and 144 are adapted so that each conveyer drive motor 142 and 144 may be independently turned on or off or independently operated over a continuous range of speeds in either a clockwise or counter clockwise direction.

It should be noted that the present invention can be adapted to create an alternative embodiment of a very low profile single conveyer oven. Because the diameter and speed of a centrifugal fan can be varied, it would be possible to combine small diameter centrifugal fans with plenums for feeding pairs of hot air manifolds disposed around a single conveyer. In this way, an extremely low profile single conveyer oven could be provided.

The skilled reader, in view of this specification may envision numerous modifications and variations of the above disclosed preferred embodiment. Accordingly, the reader should understand that these modifications and variations, and the equivalents thereof, are within the spirit and scope of this invention as defined by the following claims, wherein:

I claim:

1. A low profile conveyer oven comprising an oven cabinet, two conveyers, a fan box, an air heater, air return passages, two sets of manifolds and two centrifugal fans;

said oven cabinet adapted for supporting said conveyers, said conveyers each having a direction of travel and each disposed transversely within the front of said oven cabinet one over the other;

said fan box disposed behind said oven cabinet, said heater for heating hot cooking air, said air return passages in communication with said oven cabinet and said fan box for returning air from said oven cabinet to said fan box and said heater for reheating;

said two sets of manifolds each having three hot air manifolds adapted to surround said conveyers and provide hot cooking air thereto; and said centrifugal fans adapted for rotation about a generally common axis of rotation substantially parallel to said direction of travel of said conveyers, said centrifugal fans also having three channeled plenums for directing hot cooking air into each of said three hot air manifolds of said two sets of manifolds.

2. A low profile conveyer oven as set forth in claim 1 further comprising an oven cabinet having an openable front panel and two side walls, each of said side walls having a bottom cantilevered portion a top cantilevered portion and a center cantilevered portion adapted to receive said conveyers from the front or either side of said oven cabinet.

3. A low profile, dual conveyer oven comprising an oven cabinet, two closely spaced conveyers and an air heating and circulation system;

each of said conveyers having a drive means;

said oven cabinet having an openable front panel and two side walls, each of said side walls having a bottom cantilevered portion a top cantilevered portion and a center cantilevered portion adapted to receive said conveyers from the front or either side of said oven; and said air heating and circulation system having a fan box, burner tube mounted in said fan box for heating hot cooking air, side mounted return air ducts and a central return air opening, at least two side fed centrifugal fans mounted on a common shaft, plenums and hot air manifolds, each of said side fed centrifugal fans adapted to draw air in along said common shaft and expel a stream of air in to each of said plenums, each of said plenums adapted to distribute hot cooking into said hot air manifolds, said hot air manifolds adapted to surround said conveyers and supply said conveyers with said hot cooking air, said hot cooking air returning through said side mounted air ducts and through said return air opening to said fan box for reheating by said burner tube.

4. The low profile, dual conveyer oven of claim 3 further comprising conveyer drive means wherein each of said conveyers are separately driven by a separately controlled drive motor capable of driving each of said conveyers at different speeds and in different directions.

* * * * *